United States Patent [19]

Hill

[11] 4,175,117

[45] * Nov. 20, 1979

[54] PRODUCTION OF CERAMIC POWDERS FOR FERRITE, SPINEL, TITANATE AND GARNET PRODUCTION

[75] Inventor: Brian Hill, Ramsey, N.J.

[73] Assignee: The International Nickel Company, Inc., New York, N.Y.

[*] Notice: The portion of the term of this patent subsequent to Aug. 20, 1991, has been disclaimed.

[21] Appl. No.: 801,727

[22] Filed: Jan. 17, 1977

Related U.S. Application Data

[60] Division of Ser. No. 501,632, Aug. 24, 1975, abandoned, which is a continuation-in-part of Ser. No. 261,798, Jun. 12, 1972, abandoned.

[51] Int. Cl.$^2$ .............................................. B02C 19/12
[52] U.S. Cl. ..................................... 423/594; 106/65; 106/73.31; 106/73.4; 241/27; 252/62.57; 252/62.62; 252/62.63; 423/598; 423/600; 423/625
[58] Field of Search ............... 423/594, 598, 625, 600; 241/22, 27, 25

[56] References Cited

U.S. PATENT DOCUMENTS

| | | | |
|---|---|---|---|
| 3,367,766 | 2/1968 | Barrington et al. | 423/625 |
| 3,591,362 | 7/1971 | Benjamin | 241/27 X |
| 3,670,970 | 6/1972 | Szegvari | 241/27 |
| 3,830,435 | 8/1974 | Hill | 241/27 |

OTHER PUBLICATIONS

Naeser, G. "Mechanical Activation of Solid Materials & Its Technological Significance"-Int'l. J. of Powder Metallurgy (1970)-6(2) pp. 3-11.

Primary Examiner—Helen M. McCarthy
Attorney, Agent, or Firm—Raymond J. Kenny; Ewan C. MacQueen

[57] ABSTRACT

A process and products produced thereby, e.g., ferrites, in which ceramic powder particles are subjected to high transmissive energy milling under dry conditions and with given ratios of impacting media to powder, the milling being conducted for a period beyond the threshold point of the powder constituents, whereby dense, composite powder particles are obtained having an interdispersion of initial constituent particles, a large internal interfacial surface within individual product powder particles, etc.

11 Claims, 1 Drawing Figure

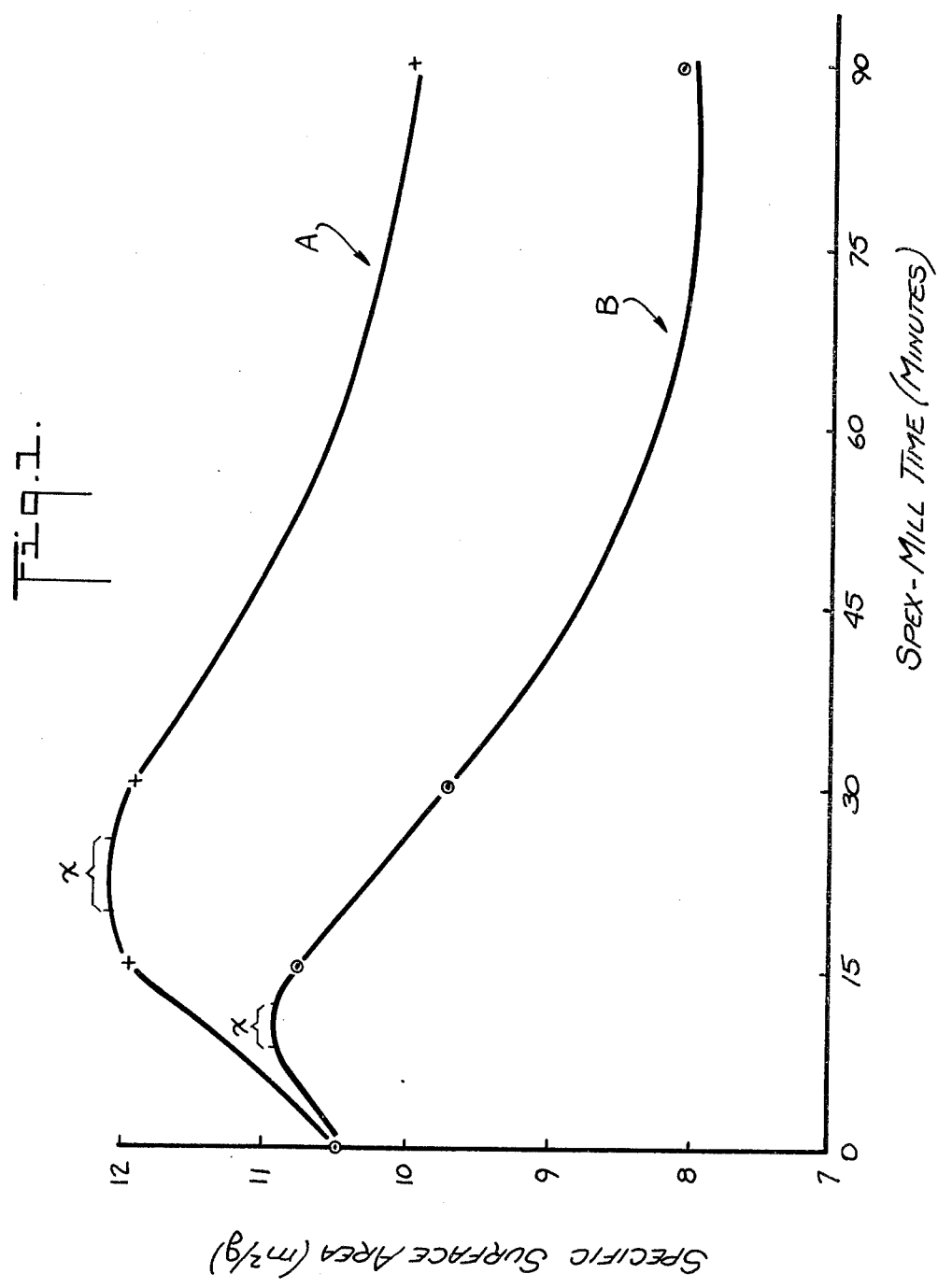

PRODUCTION OF CERAMIC POWDERS FOR FERRITE, SPINEL, TITANATE AND GARNET PRODUCTION

This application is a division of U.S. Ser. No. 501,632 filed Aug. 24, 1975 which in turn is a continuation-in-part of U.S. Ser. No. 261,798, filed June 12, 1972, both now abandoned.

The present invention is directed to ceramic materials and the like, particularly to products produced therefrom such as ferrites, spinels, titanates and garnets.

It is known the term "ceramics" includes a most diverse group of inorganic materials having a variety of properties and end uses. Viewed from the standpoint of electrical properties, for example, ceramics range from semi-conductors to insulators of extremely high dielectric constant and strength, with those having a perovskite structure exhibiting piezo-electric properties. Ferrites, most of which possess a spinel structure, are outstandingly ferrimagnetic. And since most ceramics are of high melting point and chemically inert, they are particularly suitable in the handling of molten metals, glasses, slags, etc.

Ceramic materials employed in the production of, for example, ferrites, have been produced from ceramic mixtures, e.g., nickel oxide and iron oxide, by processes involving grinding to reduce agglomeration, pressing, either hot or cold, and ultimately final firing to sinter the object into the shape desired. A drawback common to virtually all ceramic powders is their inherent porous nature. This, in turn, contributes to low bulk and green compacting densities, giving rise to shrinkage and attendant problems, including the necessity of using exceedingly high (and costly) hot pressing temperatures. Green strength is also low. Too, it has been virtually impossible to cause intra homogeneity between two or more ceramics as any number of them are quite brittle and fragment upon impact. This has significantly precluded solid state interdispersion bonding of such particles as is contemplated herein.

Too, in terms of processing, say, component oxide powders, long periods are normally required. Usually starting powders are blended by ball milling in the presence of a slurry for an extended period, e.g., 24 hours. The slurry is then dried and heated to a high temperature to form the compound. This calcined or fired material must then be comminuted as by ball milling, again usually in the presence of a liquid and for a period of circa 24 hours. This is followed by drying and compacting into a solid mass using a binder, whereupon it is finally fired or sintered.

Thus, it has remained highly desirable to provide ceramic powders for producing ferrites, spinels, titanates and garnets, the powder being characterized by (a) higher bulk and compacted densities, (b) less shrinkage and thus enhanced dimensional accuracy in respect of the fired articles, (c) improved green strength, and (d) capability of being fired at lower temperatures, thereby reducing cost and contributing to achieving sintered articles of finer grain size and higher strength. Moreover, shorter processing periods would be decidedly attractive.

BRIEF DESCRIPTION OF THE DRAWING

FIG. 1 is a graph showing the interrelation of milling time with specific surface area of alumina powders.

Generally speaking, the present invention involves dry, high transmissive energy milling of pre-selected, powder ceramic materials, i.e., those which are desired for the production of a desired ferrite, spinel, titanate or garnet to produce dense, composite, product powder particles, the product particles being characterized by an intimate intradispersion of initial constituent particles, a large internal interfacial surface within individual product powder particles and a surface area less than that of the original individual particles. A mixture of two or more initial ceramic powders can be subjected to dry, high transmissive energy milling, whereupon composite particles are produced having individual constituents distributed substantially uniformly at close interparticle spacings within the product powder particles. Ceramic powder composites of two or more constituents are less brittle than the brittle components from which they are formed and are, unexpectedly, quite homogeneous, being intimately interdispersed through mechanical cold bonding in the solid state. Depending upon particle size of the initial materials and milling time, interparticle spacings in the product powder will usually be substantially less than 10 microns, e.g., 5 microns or 1 micron or even much less, e.g., 0.1 micron.

The high transmissive energy dry milled ceramic powders of the invention are characterized by improved bulk or pack density (e.g., when poured into a container and packed by tapping container), by enhanced pressability to provide better green strength in comparison with identical materials prepared by ordinary ball milling, the latter utilizing liquid media for a similar purpose, grinding being accomplished largely through gravitational action.

In contrast to conventional ball milling of ceramics, particle size of the product powder particle mixture as viewed against the initial ceramic powder constituents is markedly increased as opposed to being comminuted and surface area is reduced rather than enlarged. Accordingly, energy transmission to the particles milled must be sufficiently intense to cause mechanical cold bonding of particles with the particles being most intimately interdispersed, a concept which, insofar as I am aware, is completely unknown in respect of the treatment of ceramic materials normally regarded as being inert.

Still further, as will be shown herein, not only are slurries dispensed with as well as binders but milled particles such as oxide can be compacted and fired directly at the sintering temperature. I am not aware of any prior instance of such simultaneous sintering and compound formation. Of course, drying and multiple stage ball milling is eliminated.

High transmissive energy dry milling may be accomplished in high-energy machines such as the Szegvari attritor, the high-speed laboratory shaker mill (Spex mill) or even in vibratory ball mills, but the ratio of ball-to-powder should be at least about 3:1, preferably at least 5:1 and most advantageously at least 10:1 or 15:1. (As is known, presently available Spex mills are generally small, and thus, are useful largely for laboratory work as opposed to commercial production.) During the course of the process, comminution of both initial constituents and mechanically cold-bonded interdispersed constituents also takes place, with a major site of the bonding and comminution actions apparently being the surface of the grinding media, e.g., balls, which may be steel, tungsten carbide, nickel, alumina, etc.

In carrying forth the invention, it is important that the surface lattice structure of the ceramic powders be broken down, altered or otherwise disrupted by the dry, high transmissive energy bombardment. By so doing, a considerable number of surface defects are formed, it being deemed that such defects are necessary to enable interdispersion bonding and particle growth to ultimately take place; otherwise, mere agglomeration will primarily take place (agglomeration has largely occasioned the use of liquid media and surfactants heretofore). The onset of the mechanical cold bonding phenomenon can be referred to as the "threshold point" and is depicted at region "X" in the curves of FIG. 1 (which are based on alumina but deemed applicable generally for ceramic powders). It represents the approximate point in time during which the slope of the comminution vs. bonding curve is changing from a comminution zone (powders are primarily comminuted or fragmented) through a neutral zone (tangent to the curve being about zero at which point neither comminution nor bonding significantly exceeds the other) and then into a bonding zone value (particle growth and reduced surface area predominates). Milling should be continued well beyond the "threshold point".

The overall milling period, as will be understood by those skilled in the art, cannot be precisely defined for it will obviously depend on the particular ceramic powders being milled, the amount of energy transmitted from the bombarding media to the powder, including ball-to-powder ratio, etc. For commercial purposes, a milling period of from two hours up to four to six hours can be used.

It is important that the milling be conducted dry and the use of solid or liquid separating agents, lubricants, detergents, etc., be avoided in the mill as otherwise the interdispersion bonding and the increase in internal interfacial surface which characterize the intensively dry milled powders is undesirably interfered with or is prevented. (I have not used surfactants, but if powder packing against the walls or corners of the high energy machine, e.g., a Szegvari attritor, become troublesome then a small amount of surfactant agent such as stearic acid or oxalic acid could be used.) The increase in internal interfacial surface can be measured by a combination of increase of particle size measured by electron microscopy and decrease in specific surface area as measured by B.E.T. apparatus.

As intensive dry milling proceeds the internal homogeneity of the product powder improves up to an optimum milling time which, as will be appreciated by the artisan, is deemed to be mostly a function of the powder system being milled. Continued milling does not appear to further improve homogeneity of the product powder. Homogeneity can be followed by the electron beam microprobe, the scanning electron microscope, and similar techniques. In some cases, intensive dry milling provides homogeneity in the product on a scale approaching the molecular, a point exceeding the capability of presently available measuring devices.

In conducting dry, high transmissive energy milling in accordance with the invention, it is usually necessary to employ a charge comprising grinding media together with the powdered material to be milled. The entire charge is then subjected to accelerative forces such that a substantial portion of the grinding elements, e.g., ball elements, are continuously and kinetically maintained in a state of relative motion. In striving for best results, it is advantageous to maintain a major portion, e.g., 75% or more, of the attritive elements out of static self contact, the kinetic accelerative forces causing a substantial number of the elements repeatedly to collide with each other. It is difficult to achieve such a state of kinetic activation of a high proportion of attritive elements, e.g., balls, in the ordinary ball mill in which usually a substantial proportion of the ball elements, i.e., those in the lower portion of the ball charge, remain in static bulk contact. Usually, only the balls in the active cascading zone of an ordinary ball mill can be said to be kinetically active.

Advantageously, at least about 60%, e.g., 80%, of the grinding media present in the charge should be maintained in a highly activated state. It is usually necessary that mechanical energy be applied to the ball elements multidirectionally, such as through the application of vibratory or oscillatory motion to the balls. As an example, the high speed shaker mill (Spex mill) oscillates at rates of up to 1200 cycles or more per minute, subjecting attritive elements present in the mill to velocities of up to about 300 centimeters per second. In such a mill the ratio of ball elements by weight to the weight of the powder being milled may be relatively low, e.g., about 3:1 or more. At lower levels of applied mechanical force than can be realized in the high speed shaker mill, it is usually necessary that the weight ratio of grinding elements, e.g., balls, to the powder being milled should be higher, e.g., 10:1 or more.

With regard to the particle size range of powdered materials treatable in accordance with the invention, they may vary over the range from about 0.01 to about 150 microns, preferably not exceeding about 0.05 to about 10 microns. Coarse initial powders, e.g., about 40 microns average particle size, tend to prolong the milling time since the particles must be comminuted in the mill before an homogeneous dispersion with large interfacial can be obtained.

To give those skilled in the art a better appreciation of the invention, the following examples are given:

EXAMPLE I

A charge consisting of 1.66 grams of less than one micron nickel oxide and 3.34 grams of less than one micron iron oxide ($Fe_2O_3$) was milled dry in a Spex mill with 100 grams of 5/16" diameter 52100 steel balls at a 20:1 ball-to-powder ratio for 45 minutes. Microstructural analysis reflected that particle size of the product particles was larger than that of the initial constituents. When the thus milled material was heat treated in oxygen at a low reaction temperature of 900° C. for one hour it was found that 81% of the mixture had reacted to form nickel ferrite. On the other hand, when a mixture of the same materials in the same proportions was ball milled in an ordinary ball mill at a ball-to-powder ratio of 20:1 for 8 hours it was found that the resulting product, when heated in oxygen at 900° C. for one hour yielded only 63% reaction to form nickel ferrite.

EXAMPLE II

A charge consisting of 1,153 grams of less than one micron nickel oxide and 2,479 grams of less than one micron iron oxide ($Fe_2O_3$) was milled dry in a 4-S Szegvari attritor with 72.64 kilograms of 5/16" diameter 52100 steel balls at a 20:1 ball-to-powder ratio for 7½ hours. The product particles upon microstructural analysis were of a particle size greater than that of the initial constituents. When the thus-milled material was heat-treated in oxygen at 900° C. for one hour, it was found that 90% of the mixture had reacted to form nickel ferrite. On the other hand, when a mixture of the same materials in the same proportions was ball milled in an ordinary ball mill at a ball:powder ratio of 20:1 for 8 hours it was found that the resulting product, when heated in oxygen at 900° C. for one hour yielded only 63% reaction to form nickel ferrite. This reflects that the invention can be carried out on a large scale basis.

EXAMPLE III

Using the conditions of Example I, a charge consisting of 0.477 grams of less than one micron nickel oxide, 1.118 grams of less than one micron zinc oxide, and 3.41 grams of less than one micron iron oxide ($Fe_2O_3$) was milled dry in a Spex mill. Product particle size was again greater than the charge materials. When the thus milled material was heat treated in oxygen at the low reaction temperature of 900° C. for one hour, it was found that 100% of the mixture had reacted to form nickel zinc ferrite. In contrast, when a mixture of the same materials in the same proportions was ball milled with water in an ordinary ball mill at a ball-to-powder ratio of 10:1 for 24 hours, it was found that the resulting product, when heated in oxygen at 900° C. for one hour yielded only 93% reaction to form nickel zinc ferrite.

It perhaps should be emphasized at this point, that since lower reaction temperatures can be employed herewith than otherwise might be the case, fuel economies can be effected. And this is not an unattractive commercial consideration given current conditions.

EXAMPLE IV

To illustrate that in accordance herewith simultaneous sintering and compound formation can be brought about (one firing), a 4 kg charge of 9.5% NiO, 22.4% ZnO and 68.1% $Fe_2O_3$ powder of about one micron particle size was attrited (no additive, solid or liquid,) in an 4-S attritor using 72 kg hardened 52100 steel balls for 15 hours in a sealed atmosphere.

Thereafter, the milled powder was compacted (isostatically) at 70,000 psi for 5 minutes and directly sintered (no reaction firing or remilling) at 1350° C. for one hour. A ferrite body of 96% density was obtained, the initial permeability thereof being 800.

For direct sintering, the constituents should be brought together to form very small diffusion paths. This lends to facilitation of compound formation. A diffusion path of one micron or so (or less) is preferred since appreciably larger sizes tend toward a nonhomogeneous final sintered product. For a nickel-zinc ferrite, sintering should be above 1300° C. and less than 1400° C. Higher temperatures bring on needless grain growth and lower density. Density is poorer at lower temperatures. It might be added that if a homogeneous powder is produced that has no interparticle aggregation of particle-to-particle bonding, then segregation can occur on powder handling and composition, leading to increased time and/or temperature for sintering. This can result in poorer properties.

In addition to the foregoing, other advantages of the instant invention include a greatly reduced milling period in comparison with conventional ball milling and this is a decided economic advantage, apart from delivering a superior product. This is achievable in periods of but one half to three hours in an energy machine such as the Spex mill or a roughly equivalent high energy apparatus versus the eight to forty-eight hours or more common to standard processing.

The ability to provide powders having fine-scale homogeneity in accordance with the invention extends to a wide variety of solid metal compounds, e.g., metal oxides, and mixtures of such compounds. The proportions of constituents within a mixture can be varied from a few hundredths of a percent to about 100% at the expense of others, and still the product powders are homogeneous. This fact indicates that the invention may be utilized in the production of articles such as a lithia-doped nickel oxide semiconductor.

This invention is applicable to a wide variety of ceramic and ceramic combinations including compounds such as the oxides of aluminum, titanium, magnesium, beryllium, calcium, lanthanum, cerium, yttrium, iron, nickel, cobalt, copper, manganese, zinc and chromium. It is considered that the subject invention is particularly applicable in the production of spinels, such as nickel ferrite; hexagonal ferrites, e.g., barium ferrite; titanates, including barium titanate; and garnets, such as yttrium iron garnet.

As will be apparent to the artisan, the invention is to be distinguished from producing "powder agglomerates" which are essentially clusters or masses of loose (sometimes packed) powder, and also from welding in which one constituent is simply joined to another, their being a distinct absence of solid state intimate and homogeneous interdispersion bonding.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for producing dense, composite ceramic product powder particles, the product particles being characterized by (i) an intimate interdispersion of initial constituent particles, (ii) a large internal interfacial surface within individual product powder particles with the individual constituent particles being distributed substantially uniformly at close interparticle spacings within the product powder particles, which comprises forming a charge composed of milling impacting elements and the ceramic powder particles to be milled, the ceramic powder charge particles being formulated to provide composite product powder particles which upon heating react to form a member from the group consisting of spinels, ferrites, titanates and garnets, with the weight ratio of impacting elements to powder being greater than 3:1, subjecting the charge under dry conditions to high transmissive energy milling such that the individual constituent powder particles are continuously brought into contact with the compressive energies of the milling impacting elements, and continuing the milling for a period beyond the threshold point of the powder constituents such that the constituent powder particles undergo substantial mechanical cold bonding in the solid state and such that the surface area of the composite product powder particles is less than the constituent powders with the particle size being markedly increased, whereby dense, composite, mechanically cold bonded ceramic product powder particles are produced, the composite product particles being further characterized by a high degree of homogeneity.

2. A process in accordance with claim 1 in which nickel oxide forms one of initial powder constituents.

3. The process in accordance with claim 1 in which nickel oxide and ferric iron oxide comprise the initial powder constituents.

4. The process in accordance with claim 1 in which at least nickel oxide and zinc oxide are used as initial powder constituents.

5. The process in accordance with claim 1 in which the initial powder particles are selected to give barium ferrite.

6. The process in accordance with claim 1 in which the initial powder particles are selected to give barium titanate.

7. The process in accordance with claim 1 in which the initial powder particles are selected to give yttrium iron garnet.

8. A process for producing ferrite particles in which the product powder particles of claim 2 are reacted to form ferrite particles.

9. A process for producing ferrite particles in which the product powder particles of claim 4 are reacted to form ferrite particles.

10. A process for producing a ferrite body in which the ferrite particles of claim 8 are consolidated and fired to produce the ferrite body.

11. A process for producing a ferrite body in which the ferrite particles of claim 9 are consolidated and fired to produce the ferrite body.

* * * * *